Feb. 7, 1961  J. F. GURLEY, JR  2,970,817
MIXING APPARATUS
Filed Aug. 4, 1958

INVENTOR.
JESSE FRED GURLEY, JR.
BY
ATTORNEYS

United States Patent Office 2,970,817
Patented Feb. 7, 1961

2,970,817

MIXING APPARATUS

Jesse Fred Gurley, Jr., Pittsburgh, Pa., assignor to Mobay Chemical Company, Pittsburgh, Pa., a corporation of Delaware Filed Aug. 4, 1958, Ser. No. 752,789

2 Claims. (Cl. 259—7)

This invention relates generally to an apparatus for mixing liquids together rapidly and, in particular, to an apparatus adapted for mixing the liquid components of a polyurethane plastic together. This application is a continuation-in-part of my copending application Serial Number 663,682 filed June 5, 1957.

Polyurethane plastics may be prepared by reacting an organic compound having at least two hydrogen atoms reactive with an NCO group with an organic polyisocyanate and a chain extender or cross-linking agent such as, for example, water or the like. Examples of suitable organic compounds having reactive hydrogen atoms include polyesters, polyalkylene ether glycols, polyalkylene thioether glycols, polyester amides and the like. The organic compounds having reactive hydrogens are substantially more viscous than the polyisocyanate and other components used in preparing polyurethanes. Consequently, it is very difficult to effect substantially instantaneous mixing of the components.

One of the most successful apparatuses heretofore available for mixing the various components of a polyurethane plastic together is described in the Hoppe et al. Patent 2,764,565. The apparatus described in this patent has a mixing chamber provided with injection nozzles through which the polyisocyanate and other components are injected into the more viscous organic compound having reactive hydrogens. Although the apparatus disclosed in the Hoppe et al. patent effects complete mixing substantially instantaneously, some difficulty has been experienced in intermittent operation because chemical reaction occurs between the compounds remaining in the mixing chamber with solidification and plugging of the apparatus. It has, therefore, been necessary to drain the liquids remaining in the mixing chamber immediately each time the apparatus is stopped and to completely clean the apparatus before it can be used in a subsequent operation.

It is, therefore, an object of this invention to provide a mixing device which will effect substantially instantaneous mixing of liquid components and which can be used for mixing components which will react together to form a solid without it being necessary to clean the apparatus after each operation. Another object of the invention is to provide an improved apparatus for mixing liquids which will react together to form a solid material. Still another object of the invention is to provide an apparatus which will effect substantially instantaneous mixing of the components of a polyurethane plastic and which can be used intermittently without cleaning the apparatus each time it is stopped.

Other objects will become apparent from the following description with references to the accompanying drawing in which Figure 1 is a longitudinal view, partially in section, of one embodiment of the invention;

Figure 1:
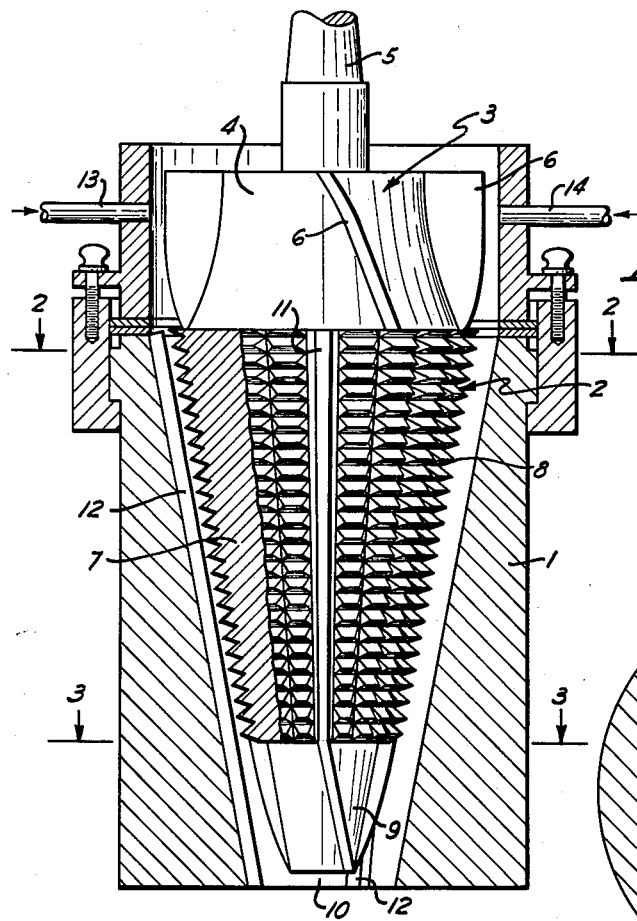

The foregoing objectives and others are accomplished in accordance with this invention, generally speaking, by providing an agitating means for mixing liquids together having a shaft carrying a stirrer which has the general shape of two frustums or cones with abutting bases, one of the substantially conically shaped elements lying adjacent the point where the stirrer and shaft meet and the other substantially conically shaped element having a portion with a plurality of tooth-like projections with at least one rib extending throughout the length thereof. The apex of the element having tooth-like projections preferably has a substantially smooth surface. The rib extends through the smooth portion. Preferably, the stirrer has the shape of two frustums although one having the shape of two cones with abutting bases may be used. The rib or ribs separate a cross-section of the two portions into segments.

The invention further contemplates an agitator of the above-described type in combination with a mixing chamber which is substantially concentric with that element of the stirrer having the tooth-like projections and only slightly larger in diameter than both elements. Hence, the mixing chamber has a capacity which is relatively small.

The substantially conically shaped element of the stirrer adjacent the point where the shaft and stirrer meet is preferably provided with oblique ribs which serve as pumping vanes tending to move liquids in the chamber towards the discharge end. Preferably, these vanes form an angle of from about 5° to about 60° with the longitudinal axis of the stirrer. The substantially conically shaped element of the stirrer having the tooth-like projections usually has a greater longitudinal dimension than the portion adjacent the point where the shaft and stirrer meet.

The mixing chamber is provided with inlet means adjacent that element of the stirrer which is preferably provided with pumping vanes. Best results have been obtained when at least some of these inlet means are injection nozzles. The injection nozzles may be located around the circumference of the mixing chamber at one longitudinal level or they may be spaced apart longitudinally in so long as all of the inlets are in that area of the chamber wall opposite the portion of the stirrer which is preferably provided with pumping vanes.

It is important that the space between the stirrer and the wall of the mixing chamber be relatively small in order that the capacity of the mixing chamber for the liquids be relatively small. In a preferred embodiment of the invention, the mixing chamber is of such construction that its relative position with respect to the stirrer can be changed to provide various size spaces between the two and thus provide a mixing apparatus which can be adjusted to different volumes. The inner wall of the chamber may be substantially smooth, but it has been found that more rapid and more uniform mixing is obtained if the chamber has a plurality of longitudinally extending baffles. The combination of the agitator with a mixing chamber having baffles on its inner wall is, therefore, preferred. The baffles may extend throughout the length of the chamber opposite the element of the stirrer having tooth-like projections or it may extend only partially through the length of that portion of the chamber.

In preparing polyurethane plastics in the apparatus provided by this invention, any mixture of components which will react together to form a solidified polyurethane may be used. Suitable processes and formulations for making cellular polyurethanes are disclosed in the Hoppe et al. Patent 2,764,565, while suitable formulations and processes for making substantially nonporous rubber-like polyurethanes are disclosed in this patent as well as U.S. Patents 2,620,516, 2,621,166 and 2,729,618. Any of these processes and formulations and others may be used in preparing polyurethanes in the apparatus provided by this invention.

The liquids having the lower viscosity, such as the polyisocyanate and catalysts, should preferably be injected into the more viscous liquid under a pressure substantially higher than the back pressure in the mixing chamber. Any pressure greater than the pressure in the chamber may be used but, ordinarily, best results are obtained when the pressure is in the order of from about 300 pounds per square inch or more. The agitator of the improved design provided by this invention makes it possible to operate at lower injection pressures than would be permissible with an agitator of inferior design. Bosch pumps or similar devices may be used to move the liquids through the injection nozzles.

As indicated hereinbefore the agitator has a shaft carrying a stirrer divided into two substantially conically shaped elements having abutting bases. That element of the stirrer which is spaced from the point where the stirrer and shaft meet has tooth-like projections over most of its surface, but that end of this element which is next the discharge outlet in the mixing chamber has a substantially smooth surface. Ribs extend throughout the length of the element having the tooth-like projections and, in a preferred embodiment, the ribs extend obliquely through the portion having the smooth surface. In a preferred embodiment, the rib extending between the rows of tooth-like projections lies in a plane parallel to the longitudinal axis of the stirrer. The relative length of the tooth-like portion and the portion having a substantially smooth surface will vary, but ordinarily the tooth-like portion will be longer than the other one. Usually, the tooth-like portion will be from about two to about ten times the length of the smooth surfaced portion. In fact, in some embodiments the element having tooth-like projections may not have any smooth portion. In other words, portion 9 in the drawing might be eliminated in some embodiments.

In operating the apparatus in the preparation of a polyurethane plastic, the various liquid components such as, for example, liquid components which react to form a polyurethane plastic, are introduced into the mixing chamber while the stirrer is constantly turning at a relative high speed of say from about 1,500 to about 10,000 revolutions per minute. The components are substantially instantaneously mixed and the resulting mixture flows from the apparatus and later forms a polyurethane plastic by chemical reaction. Any of the components disclosed in the aforesaid patents for making polyurethanes may be used in practicing the process proposed by this invention.

Referring now to the drawing for a detailed description of one embodiment of the invention, mixing chamber 1 encloses an agitator 2. Agitator 2 has a stirrer designated broadly as 3 mounted on shaft 5. Stirrer 3 has the shape of two frustums. Substantially frusto-conically shaped element 4 has a plurality of oblique pumping vanes 6. Substantially frusto-conically shaped element 7 has a base which abuts the base of element 6 and has a plurality of tooth-like projections 8 in that portion extending from its base. Portion 9 of element 7 which lies adjacent discharge opening 10 of mixing chamber 1 has a substantially smooth surface. A rib 11 extends through the length of element 7. Rib 11 extends obliquely through the length of portion 9, preferably at an angle of from about 5° to about 30° at a point adjacent the tooth-like projection portion with the longitudinal axis of the stirrer. Mixing chamber 1 is provided with a baffle 12 on the inner wall thereof which cooperates with the tooth-like projections 8 to insure rapid mixing. In another embodiment, chamber 1 may be provided with a means for heating or cooling the contents of the chamber such as, for example, a jacket for circulating fluids such as hot or cold water or a heating coil.

Figure 2:
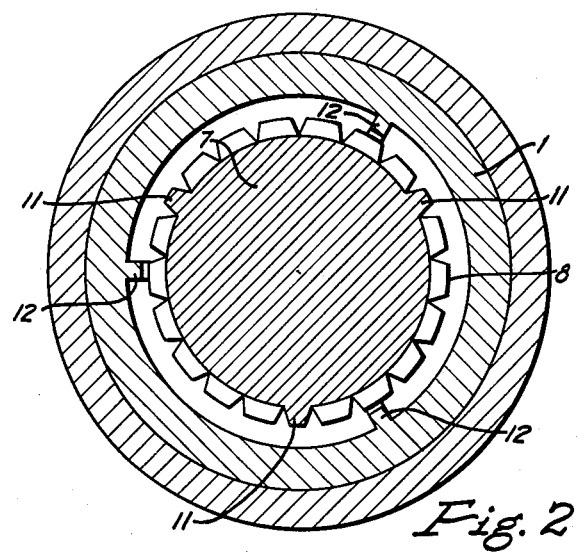
Figure 2 is a cross-section taken along the line 2—2 of Figure 1.

As shown in Figure 2, the mixing chamber may have a plurality of baffles 12. In the particular embodiment illustrated, three baffles 12 are used. Likewise, element 7 may be provided with more than one rib 11. Usually not more than three ribs and three baffles will be required.

Figure 3:
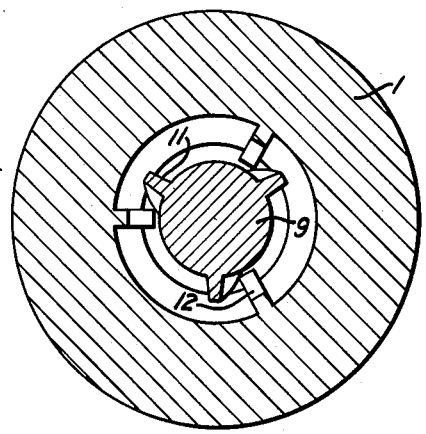
Figure 3 is a cross-section taken along the line 3—3 of Figure 1.

The cross-section in Figure 3 illustrates the oblique ribs 11 in that portion of element 7 which has a smooth surface.

In mixing liquids in the apparatus provided by this invention, liquid components are introduced through inlets 13 and 14. If the apparatus has pumping vanes 6, the liquid is forced downwardly in the mixing chamber towards the tooth-like projections. If no vanes are present, the liquid flows by gravity downwardly. The liquids are rapidly mixed together as they are stirred by the tooth-like projections and the swirl thereof is impeded by baffles 12. Mixing can be achieved in a very short interval of time and the mixed liquid is discharged through opening 10. If ribs 11 extend obliquely near the discharge nozzle, they will act as a pump to force the liquid out of the opening 10. Ribs 11 also increase the turbulence created by the agitator over that which would be obtained if only tooth-like projections were present. A shearing action is obtained each time a rib 11 passes a baffle 12.

Preferably, tooth-like projections 8 form a screw thread by being wound spirally around the stirrer. The screw thread imparts some pumping action on the liquid forcing it towards the discharge opening.

In another preferred embodiment, the base of rib 11 does not rest throughout its length on the underlying surface of the stirrer. In other words, spacers are used which provide for openings between the base of the rib and the underlying surface of the stirrer. Liquid flows through these perforations in the rib which assists in cleaning the device. Rib 11 may lie in a plane which is perpendicular to the base of the frustums and parallel to the longitudinal axis of the stirrer, or rib 11 may lie in a plane which is perpendicular to the base of the substantially conical elements and at an angle of less than 90° with the longitudinal axis of the stirrer. Pumping vanes 6 and rib 11 on portion 9 may be perforated if desired.

As indicated hereinbefore, one of the most advantageous characteristics of the apparatus provided by this invention is the relatively low volume of the mixing chamber. As an example, the stirrer 2 may be only about $\frac{1}{16}''$ or less smaller than the corresponding inner diameter of say about 2" of the mixing chamber at the abutting base of the two substantially conical elements. An apparatus having such a low volume permits intermittent operation without undesirable results and without the necessity of cleaning between operations. The stirrer and mixing chamber may be made of any suitable metal or plastic such as, for example, steel, aluminum, nylon or the like.

Although the invention has been described in considerable detail in the foregoing for the purposes of illustration, it is to be understood that such detail is solely for this purpose and that variations can be made by those skilled in the art without departing from the spirit and scope of the invention except as is set forth in the claims.

What is claimed is:

1. An apparatus for mixing liquids comprising a chamber having an inlet and discharge means in combination therewith, a means for stirring a plurality of liquids in said chamber until they are intimately mixed together, said stirring means comprising a shaft carrying a stirrer adjacent one end thereof, said stirrer having first and second conically-shaped elements with abutting bases, said second conically-shaped element being disposed adjacent said discharge means, said second conically-shaped element having a plurality of non-serrated ribs extending substantially longitudinally throughout the length thereof and a plurality of tooth-like projections between said ribs, said tooth-like projections being formed by the intersection of a plurality of annular grooves and a plurality of longitudinally extending grooves, said chamber being substantially conically-shaped adjacent said second conically-shaped element.

2. The apparatus of claim 1 in which said conically-shaped portion of said chamber has a plurality of longitudinally extending baffles which operate in conjunction with said rib-like members to cause a shearing action.

References Cited in the file of this patent

UNITED STATES PATENTS

| | | |
|---|---|---|
| Re. 8,845 | Taylor | Aug. 12, 1879 |
| 655,805 | Shellaburger | Aug. 14, 1900 |
| 1,350,261 | Lyon | Aug. 17, 1920 |
| 1,794,972 | Mayer | Mar. 3, 1931 |
| 2,017,598 | Keet | Oct. 15, 1935 |
| 2,857,144 | Gurley et al. | Oct. 21, 1958 |